United States Patent
Mukasa

(10) Patent No.: US 6,724,966 B2
(45) Date of Patent: Apr. 20, 2004

(54) OPTICAL TRANSMISSION LINE

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 229 days.

(21) Appl. No.: 09/794,619

(22) Filed: Feb. 28, 2001

(65) Prior Publication Data

US 2002/0012509 A1 Jan. 31, 2002

Related U.S. Application Data

(63) Continuation of application No. PCT/JP00/04206, filed on Jun. 27, 2000.

(30) Foreign Application Priority Data

Jun. 28, 1999 (JP) .............................................. 11-181453

(51) Int. Cl.$^7$ ................................................. G02B 6/22
(52) U.S. Cl. ..................................... 385/127; 385/123
(58) Field of Search ................................ 385/123, 124, 385/126, 127

(56) References Cited

U.S. PATENT DOCUMENTS

| | | | | |
|---|---|---|---|---|
| 5,191,631 | A | * | 3/1993 | Rosenberg ................... 385/123 |
| 5,778,128 | A | * | 7/1998 | Wildeman ................... 385/123 |
| 5,838,867 | A | | 11/1998 | Onishi et al. |
| 5,887,105 | A | * | 3/1999 | Bhagavatula et al. ........ 385/123 |
| 6,178,279 | B1 | * | 1/2001 | Mukasa et al. ............. 385/123 |
| 6,567,596 | B2 | * | 5/2003 | Kato et al. ................... 385/123 |
| 2002/0076186 | A1 | * | 6/2002 | de Montmorillon et al. ..... 385/123 |
| 2003/0021562 | A1 | * | 1/2003 | Kumano ..................... 385/123 |

FOREIGN PATENT DOCUMENTS

| | | | |
|---|---|---|---|
| EP | 0 862 069 | 9/1998 | |
| FR | 2761483 A1 | * 3/1998 | ................ 385/123 |
| JP | 62-015503 | 1/1987 | |
| JP | 62-291605 | 12/1987 | |
| JP | 62-297808 | 12/1987 | |
| JP | 3-018161 | 3/1991 | |
| JP | 11-167038 | 6/1999 | |
| WO | WO 00/31573 | 6/2000 | |

OTHER PUBLICATIONS

K. Mukasa, et al., 23rd European Conference on Optical Communications, vol. 1, No. 448, pp. 127–130. "Novel Network Fiber to Manage Dispersion at 1.55μm with Combination of 1.3μm Zero Dispersion Single Mode Fiber," Sep. 22–25, 1997.

* cited by examiner

Primary Examiner—Rodney Bevarnick
Assistant Examiner—Mike Stahl
(74) Attorney, Agent, or Firm—Oblon, Spivak, McClelland, Maier & Neustadt, P.C.

(57) ABSTRACT

An optical transmission line configured to control both a waveform distortion due to non-linearity and a waveform distortion due to dispersion. The optical transmission line is formed by connecting in series a first optical fiber to a second optical fiber. The first optical fiber has a dispersion value of 6 to 14 ps/nm/km, and the second optical fiber has a dispersion value of −14 to −6 ps/nm/km, both for a given wavelength band within a 1.5 μm wavelength band. Further, a dispersion slope of the first optical fiber has an opposite sign to a dispersion value of the second optical fiber. In addition, the first optical fiber is arranged to be closer to an optical signal that inputs the optical transmission line than the second optical fiber.

15 Claims, 4 Drawing Sheets

(a)

(b)

OPTICAL TRANSMISSION LINE

This is a continuation of PCT/JP00/04206 filed Jun. 27, 2000.

TECHNICAL FIELD

The present invention relates to an optical transmission line which is used when, for example, a wavelength division multiplexed optical transmission is carried out.

BACKGROUND ART

The amount of communication information has tended to increase dramatically due to the development of the information society. Along with the increase of information, the wavelength division multiplexed transmission (WDM transmission) is widely recognized in the communication field and now the era of the wavelength division multiplexed transmission has arrived. In a wavelength division multiplexed transmission, light with a plurality of wavelengths can be transmitted in a single optical fiber. Therefore, the wavelength division multiplexed transmission is an optical transmission system which is suitable for large capacity high speed communication and, at present, this transmission technology is being vigorously researched.

As is widely known in the art, a single mode optical fiber, having a zero-dispersion within the wavelength band in the vicinity of the wavelength of 1.3 µm, has been established on a global scale as the transmission network for optical communication. However, in the case that the previously established single mode optical fiber having a zero-dispersion in the vicinity of 1.3 µm is utilized and wavelength division multiplexed transmission is carried out by using the wavelength band in the vicinity of 1.3 µm, the 1.55 µm wavelength band, which is the gain band of a conventional optical amplifier, and the wavelength band do not agree with each other. Therefore, the problem arises that a conventional optical amplifier cannot be utilized for the wavelength division multiplexed transmission which uses the above described single mode optical fiber and, subsequently, long distance optical communication becomes difficult. Here, the above used term, "55 µm wavelength band", means a wavelength band of which the center is approximately the wavelength 1550 nm, such as from 1530 nm to 1570 nm, and hereinafter the term, the 1.55 µm wavelength band, is used with this meaning.

Therefore, recently a system for carrying out an optical transmission by using a dispersion shift optical fiber, of which the zero-dispersion wavelength is shifted from the vicinity of 1.3 µm to the vicinity of 1.55 µm, and the above described optical amplifier has been proposed in order to solve the above described problem. When an optical signal is transmitted at a wavelength in the vicinity of 1.55 µm by using a dispersion shift optical fiber having a zero-dispersion in the wavelength in the vicinity of 1.55 µm, a signal light is amplified by the optical amplifier and a signal transmission becomes possible with little waveform distortion by dispersion.

However, while research of wavelength division multiplexed transmission technology has progressed, light signals have become of a higher power and, in the case that a dispersion shift optical fiber is used for the wavelength division multiplexed transmission, a non-linearity phenomenon due to the mutual action between each signal wave arises as a new problem. Therefore, a dispersion shift optical fiber which controls the above described wavelength dispersion and dispersion slope and which makes it possible to lower the non-linearity phenomenon is desirable as a dispersion shift optical fiber for the wavelength division multiplexed transmission.

Concerning the study for the solving of the non-linearity phenomenon, research for controlling a four light wave mixture has always been vigorous. The four light wave mixture greatly influences waveform distortion and, therefore, it is important to control this four light wave mixture. As an example of the study of four light wave mixture control, academic paper OFC '94 Technical Digest PD19, for example, reports a dispersion shift optical fiber of which the zero-dispersion wavelength is shifted from the signal light wavelength in order to control the four light wave mixture.

When an optical fiber for optical transmission has a zero-dispersion in the signal light wavelength band, a four light wave mixture can easily be produced. Therefore, the above described paper reports that control of the four light wave mixture is possible by allowing the dispersion shift optical fiber used for the optical transmission to have a microscopic dispersion at the wavelength of 1.55 µm, which is the signal light wavelength. Here, the above described microscopic dispersion is a dispersion of which the absolute value of, for example, the local dispersion (a dispersion per unit length) is approximately 2 to 3 ps/nm/km.

Since the waveform distortions by the SPM (Self-phase Modulation) or the XPM (Cross-phase Modulation) occurring in the above described non-linearity phenomenon has become a serious problem, there has recently been much research into controlling those waveform distortions. As for a means to solve this problem, the academic report OFC '97 TuN1b, or the like, report research aimed at limiting the non-linearity refractive index ($n_2$) to a small value. Moreover, research aimed at making this non-linearity refractive index a small value and research aimed at making the effective core section area of the dispersion shift optical fiber ($A_{eff}$) a large value have drawn attention. The distortion $\phi_{NL}$ of the signal through the non-linearity phenomenon is, in general, represented by the following equation (1). Therefore, when the effective core section area of the optical fiber is large the waveform distortion of the signal through the non-linearity phenomenon can be made small.

$$\phi_{NL}=(2\pi \times n_2 \times L_{eff} \times P)/(\lambda \times A_{eff}) \quad (1)$$

Here, in the equation (1), π represents the circular constant, $L_{eff}$ represents the effective optical fiber length, P represents a signal light intensity and λ represents a signal light wavelength, respectively.

The above described effective core section area is expressed by the following equation (2) by using a constant k and the mode field diameter (MFD) of the optical fiber. Therefore, the larger the mode field diameter is, the larger the effective core section area becomes and it is understood that low non-linearity can be achieved very effectively.

$$A_{eff}=k \times (MFD)^2 \quad (2)$$

In this way the expansion of the mode field diameter and the expansion of the effective core section area in an optical fiber used for the wavelength division multiplexed transmission are very important and they have drawn a lot of attention. The expansion of the mode field diameter and the expansion of the effective core section area in an optical fiber used in the wavelength division multiplexed transmission are reported in the academic paper OFC '96 WK15 and OFC '97 YuN2.

It is known that the non-linearity phenomenon can be caused more easily when the signal light intensity inputted to the optical fiber is larger. Therefore, it is proposed in the Japanese Unexamined Patent Publication No. Hei-9(1997)-211511 that an optical transmission line be formed by connecting an optical fiber with high non-linearity to the emission end of an optical fiber with low non-linearity so that the light emitted from the optical transmission line is controlled so as not to cause distortion resulting from the non-linearity phenomenon. Here, this proposal describes that the waveform distortion by the dispersion is also controlled by making the symbols of the dispersion value mutually different within the 1.5 μm wavelength band of the above described optical fiber forming the optical transmission line.

As proposed in the Japanese Unexamined Patent Publication No. Hei-9(1997)-211511, however, no concrete configuration or the like are shown with respect to the dispersion value of the optical fiber forming the optical transmission line and, instead, merely the configuration of the connection of the optical fiber with high non-linearity to the emission end of the optical fiber with low non-linearity is shown. From such a configuration only, though, it is difficult to form an optical transmission line which is able to control the distortion resulting from the non-linearity phenomenon and the distortion resulting from dispersion.

Here, in this proposal, it is possible to apply a dispersion shift optical fiber of which the dispersion value is approximately ±2 to 3 ps/nm/km within the wavelength of 1.55 μm. In this case, the absolute value of the dispersion value within the wavelength of 1.55 μm is extremely small and, therefore, there is no guarantee that the optical transmission line will receive no influence from the four light wave mixture. And, in this case, where it is attempted to carry out the wavelength division multiplexed optical transmission by using light with a wide range of wavelengths within the 1.5 μm wavelength band, the dispersion in any wavelength within this range sometimes becomes very close to zero (for example, within ±0.5 ps/nm/km). Then, the optical transmission line receives influences from the four light wave mixture.

On the other hand, the single mode optical fiber is superior in terms of low non-linearity. Therefore, in order that this characteristic is utilized to control the waveform distortion resulting from the above described non-linearity phenomenon, a proposal is made that the optical transmission line be formed of a single mode optical fiber and a short dispersion compensation optical fiber is connected to the emission end of this optical transmission line. This proposal is made in, for example, the Japanese Unexamined Patent Publication No. Hei-6(1994)-11620, or the like. This proposal attempts to implement low non-linearity of the optical transmission line using the above described configuration and to control the wavelength dispersion of the single mode optical fiber.

However, the mode field diameter within the 1.5 μm wavelength band of the dispersion compensation optical fiber becomes, in design, too small to compensate for the dispersion characteristics of the single mode optical fiber with short length, and easily causes the non-linearity phenomenon. Therefore, in the scheme of the above described Japanese Unexamined Patent Publication No. Hei-6(1994)-11620 the problem of the non-linearity phenomenon cannot be controlled.

In addition, the above described dispersion compensation optical fiber has an extremely large absolute value of the dispersion value within the wavelength of the 1.55 μm band. Therefore, the optical transmission line formed by connecting the single mode optical fiber and the dispersion compensation optical fiber has an extremely large absolute value of local dispersion (dispersion value per unit length) on the side of the dispersion compensation optical fiber. Accordingly, this optical transmission line cannot completely control the waveform distortion resulting from the dispersion even though the wavelength dispersion of the entire optical transmission line can be made approximately zero and, therefore, there is a risk that the waveform distortion resulting from dispersion might remain.

In addition, recently an optical transmission line has been proposed where a dispersion compensation optical fiber, which has dispersion characteristics opposite to those of the single mode optical fiber, is connected to a single mode optical fiber of the same length. This proposal is made in the academic paper ECOC '97 Vol. P127. The dispersion compensation optical fiber used for the optical transmission line of this proposal has low non-linearity compared to the above described dispersion compensation optical fiber which is short and compensates for the dispersion of the single mode optical fiber.

On the other hand, the dispersion value within the wavelength of 1.55 μm band of the single mode optical fiber is approximately 17 ps/nm/km and, in order to prevent the influence of a local dispersion the absolute value of the dispersion value, needs to be made even smaller. However, as for optical fibers of which the dispersion is lower than that of the single mode optical fiber, only the dispersion shift optical fiber, which has an extremely small dispersion of which the dispersion value is within ±5 ps/nm/km, is known. And this dispersion shift optical fiber cannot control the non-linearity phenomenon as described above.

In addition, recently it has become required to further increase the amount of information communicated. Taking this into account, when the wavelength division multiplexed transmission is carried out by only using the 1.55 μm wavelength band, there is a limit to the number of wavelengths which can be sent, which eventually causes saturation at a certain point. Therefore, a new optical transmission line is required which can make the 1.55 μm wavelength band a utilizable wavelength band by expanding the utilizable wavelength band for the wavelength division multiplexed transmission to include the wavelength bands on both sides of the conventional 1.5 μm wavelength band (for example, 1530 to 1570 nm). Here, the 1.5 μm wavelength band denotes a wavelength band including the conventional 1.5 μm wavelength band, such as 1520 to 1620 nm, and hereinafter the term 1.5 μm band is used in this sense.

The present invention is provided to solve the above described conventional problems. The purpose of the present invention is to provide an optical transmission line which has the characteristics as shown the following. That is to say, the purpose of the present invention is firstly, to make the dispersion of the entire optical transmission line approximately zero when the optical transmission line according to the present invention is used for the wavelength division multiplexed transmission and, secondly, to control local dispersion of the optical fiber which forms the optical transmission line and, thereby, to control the waveform distortion resulting from dispersion with almost no failure and, thirdly, to make possible a high quality signal light transmission which can control the waveform distortion resulting from the non-linearity phenomenon.

DISCLOSURE OF THE INVENTION

In order to achieve the above described purposes, the present invention provides the means for solving the problems with the configurations as follows: that is to say, the first configuration of the present invention is characterized in that said optical transmission line is formed by connecting, in series, a first optical fiber of which the dispersion value in the set wavelength band within the 1.5 μm wavelength band is 6 to 14 ps/nm/km and a second optical fiber of which the dispersion value in the set wavelength band within the 1.5 μm wavelength band is −14 to −6 ps/nm/km and in that the dispersion value in the set wavelength band within the 1.5 μm wavelength band is approximately zero for the entire optical transmission line.

The second configuration of the present invention is, in addition to the above first configuration, characterized in that the closer to the input end of an optical signal the arrangement position of the optical fiber is, the lower the non-linearity of the optical fiber is.

The third configuration of the present invention is, in addition to the above first or second configuration, characterized in that the dispersion slope of the first optical fiber is of the opposite symbol to the second optical fiber, and in that the dispersion slope in the set wavelength band within the 1.5 μm wavelength band is approximately zero for the entire optical transmission line The fourth configuration of the present invention is, in addition to the above first or second configuration, characterized in that the characteristics of the first optical fiber in the wavelength in the vicinity of the center of the set wavelength band within the 1.5 μm wavelength band are as follows: the transmission loss is 0.25 dB/km or less, the polarized wave mode dispersion value is 0.15 $ps/km^{1/2}$ or less, the bending loss with the bending diameter of 20 mm is 10 dB/m or less and the mode field diameter is 9.5 μm or more.

The fifth configuration of the present invention is, in addition to the above third configuration, characterized in that the characteristics of the first optical fiber in the wavelength in the vicinity of the center of the set wavelength band within the 1.5 μm wavelength band are as follows: the transmission loss is 0.25 dB/km or less, the polarized wave mode dispersion value is 0.15 $ps/km^{1/2}$ or less, the bending loss with the bending diameter of 20 mm is 10 dB/m or less and the mode field diameter is 9.5 μm or more.

The sixth configuration of the present invention is, in addition to the above fourth configuration, characterized in that the characteristics of the first optical fiber in the set wavelength band within the 1.5 μm wavelength band are as follows: the transmission loss is 0.25 dB/km or less, the polarized wave mode dispersion value is 0.15 $ps/km^{1/2}$ or less, the bending loss with the bending diameter of 20 mm is 10 dB/m or less and the mode field diameter is 9.5 μm or more.

The seventh configuration of the present invention is, in addition to the above fifth configuration, characterized in that the characteristics of the first optical fiber in the set wavelength band within the 1.5 μm wavelength band are as follows: the transmission loss is 0.25 dB/km or less, the polarized wave mode dispersion value is 0.15 $ps/km^{1/2}$ or less, the bending loss with the bending diameter of 20 mm is 10 dB/m or less and the mode field diameter is 9.5 μm or more.

The eighth configuration of the present invention is, in addition to the above first or second configuration, characterized in that the first optical fiber is a single peak-type optical fiber which is formed by covering a core with a cladding and of which the refractive index distribution shape forms a profile of the αth power.

The ninth configuration of the present invention is, in addition to the above third configuration, characterized in that the first optical fiber is a single peak-type optical fiber which is formed by covering a core with a cladding and of which the refractive index distribution shape forms a profile of the αth power.

The tenth configuration of the present invention is, in addition to the above fourth configuration, characterized in that the first optical fiber is a single peak-type optical fiber which is formed by covering a core with a cladding and of which the refractive index distribution shape forms a profile of the αth power.

The eleventh configuration of the present invention is, in addition to the above fifth configuration, characterized in that the first optical fiber is a single peak-type optical fiber which is formed by covering a core with a cladding and of which the refractive index distribution shape forms a profile of the αth power.

The twelfth configuration of the present invention is, in addition to the above first or second configuration, characterized in that the first optical fiber is a step-type optical fiber, which is formed by covering a center core with a side core of which the refractive index is smaller than that of said center core, and by covering said side core with a cladding of which the refractive index is smaller than that of said side core.

The thirteenth configuration of the present invention is, in addition to the above third configuration, characterized in that the first optical fiber is a step-type optical fiber, which is formed by covering a center core with a side core of which the refractive index is smaller than that of said center core, and by covering said side core with a cladding of which the refractive index is smaller than that of said side core.

The fourteenth configuration of the present invention is, in addition to the above fourth configuration, characterized in that the first optical fiber is a step-type optical fiber, which is formed by covering a center core with a side core of which the refractive index is smaller than that of said center core, and by covering said side core with a cladding of which the refractive index is smaller than that of said side core.

The fifteenth configuration of the present invention is, in addition to the above fifth configuration, characterized in that the first optical fiber is a step-type optical fiber, which is formed by covering a center core with a side core of which the refractive index is smaller than that of said center core, and by covering said side core with a cladding of which the refractive index is smaller than that of said side core.

The sixteenth configuration of the present invention is, in addition to the above first or second configuration, characterized in that the first optical fiber is a depressed center core-type optical fiber which is formed by covering a center core with a side core of which the refractive index is larger than that of said center core and by covering said side core with a cladding of which the refractive index is smaller than that of said side core and larger than that of said center core.

The seventeenth configuration of the present invention is, in addition to the above third configuration, characterized in that the first optical fiber is a depressed center core-type optical fiber which is formed by covering a center core with a side core of which the refractive index is larger than that of said center core and by covering said side core with a cladding of which the refractive index is smaller than that of said side core and larger than that of said center core.

The eighteenth configuration of the present invention is, in addition to the above fourth configuration, characterized in that the first optical fiber is a depressed center core-type optical fiber which is formed by covering a center core with a side core of which the refractive index is larger than that of said center core and by covering said side core with a cladding of which the refractive index is smaller than that of said side core and larger than that of said center core.

The nineteenth configuration of the present invention is, in addition to the above fifth configuration, characterized in that the first optical fiber is a depressed center core-type optical fiber which is formed by covering a center core with a side core of which the refractive index is larger than that of said center core and by covering said side core with a cladding of which the refractive index is smaller than that of said side core and larger than that of said center core.

The twentieth configuration of the present invention is, in addition to the above first or second configuration, characterized in that the first optical fiber is an optical fiber which is formed by covering a center core with a first side core, by covering said first side core with a second side core and by covering said second side core with a cladding and which satisfies Δ2>Δ3>Δ1 when the relative refractive index difference of said center core for said cladding is Δ1, the relative refractive index difference of said first side core for said cladding is Δ2, and the relative refractive index difference of said second side core for said cladding is Δ3.

The twenty-first configuration of the present invention is, in addition to the above third configuration, characterized in that the first optical fiber is an optical fiber which is formed by covering a center core with a first side core, by covering said first side core with a second side core and by covering said second side core with a cladding and which satisfies Δ2>Δ3>Δ1 when the relative refractive index difference of said center core for said cladding is Δ1, the relative refractive index difference of said first side core for said cladding is Δ2, and the relative refractive index difference of said second side core for said cladding is Δ3.

The twenty-second configuration of the present invention is, in addition to the above fourth configuration, characterized in that the first optical fiber is an optical fiber which is formed by covering a center core with a first side core, by covering said first side core with a second side core and by covering said second side core with a cladding and which satisfies Δ2>Δ3>Δ1 when the relative refractive index difference of said center core for said cladding is Δ1, the relative refractive index difference of said first side core for said cladding is Δ2, and the relative refractive index difference of said second side core for said cladding is Δ3.

The twenty-third configuration of the present invention is, in addition to the above fifth configuration, characterized in that the first optical fiber is an optical fiber which is formed by covering a center core with a first side core, by covering said first side core with a second side core and by covering said second side core with a cladding and which satisfies Δ2>Δ3>Δ1 when the relative refractive index difference of said center core for said cladding is Δ1, the relative refractive index difference of said first side core for said cladding is Δ2, and the relative refractive index difference of said second side core for said cladding is Δ3.

The twenty-fourth configuration of the present invention is, in addition to the above first or second configuration, characterized in that the characteristics of the second optical fiber in the wavelength in the vicinity of the center of the set wavelength band within the 1.5 μm wavelength band are as follows: the transmission loss is 0.30 dB/km or less, the polarized wave mode dispersion value is 0.15 ps/km$^{1/2}$ or less, the bending loss with the bending diameter of 20 mm is 10 dB/m or less and the mode field diameter is 5.5 μm or more.

The twenty-fifth configuration of the present invention is, in addition to the above third configuration, characterized in that the characteristics of the second optical fiber in the wavelength in the vicinity of the center of the set wavelength band within the 1.5 μm wavelength band are as follows: the transmission loss is 0.30 dB/km or less, the polarized wave mode dispersion value is 0.15 ps/km$^{1/2}$ or less, the bending loss with the bending diameter of 20 mm is 10 dB/m or less and the mode field diameter is 5.5 μm or more.

The twenty-sixth configuration of the present invention is, in addition to the above twenty-fourth configuration, characterized in that the characteristics of the second optical fiber in the set wavelength band within the 1.5 μm wavelength band are as follows: the transmission loss is 0.30 dB/km or less, the polarized wave mode dispersion value is 0.15 ps/km$^{1/2}$ or less, the bending loss with the bending diameter of 20 mm is 10 dB/m or less and the mode field diameter is 5.5 μm or more.

The twenty-seventh configuration of the present invention is, in addition to the above twenty-fifth configuration, characterized in that the characteristics of the second optical fiber in the set wavelength band within the 1.5 μm wavelength band are as follows: the transmission loss is 0.30 dB/km or less, the polarized wave mode dispersion value is 0.15 ps/km$^{1/2}$ or less, the bending loss with the bending diameter of 20 mm is 10 dB/m or less and the mode field diameter is 5.5 μm or more.

The twenty-eighth configuration of the present invention is, in addition to the above first or second configuration, characterized in that the second optical fiber is a W-type optical fiber which is formed by covering a center core with a side core of which the refractive index is smaller than that of said center core and by covering said side core with a cladding of which the refractive index is larger than that of said side core and smaller than that of said center core.

The twenty-ninth configuration of the present invention is, in addition to the above third configuration, characterized in that the second optical fiber is a W-type optical fiber which is formed by covering a center core with a side core of which the refractive index is smaller than that of said center core and by covering said side core with a cladding of which the refractive index is larger than that of said side core and smaller than that of said center core.

The thirtieth configuration of the present invention is, in addition to the above twenty-fourth configuration, characterized in that the second optical fiber is a W-type optical fiber which is formed by covering a center core with a side core of which the refractive index is smaller than that of said center core and by covering said side core with a cladding of which the refractive index is larger than that of said side core and smaller than that of said center core.

The thirty-first configuration of the present invention is, in addition to the above twenty-fifth configuration, characterized in that the second optical fiber is a W-type optical fiber which is formed by covering a center core with a side core of which the refractive index is smaller than that of said center core and by covering said side core with a cladding of which the refractive index is larger than that of said side core and smaller than that of said center core.

The thirty-second configuration of the present invention is, in addition to the above first or second configuration, characterized in that the second optical fiber is an optical fiber which is formed by covering a center core with a first side core, by covering said first side core with a second side core and by covering said second side core with a cladding and which satisfies Δ1>Δ3>Δ2 when the relative refractive index difference of said center core for said cladding is Δ1, the relative refractive index difference of said first side core for said cladding is Δ2, and the relative refractive index difference of said second side core for said cladding is Δ3.

The thirty-third configuration of the present invention is, in addition to the above third configuration, characterized in that the second optical fiber is an optical fiber which is formed by covering a center core with a first side core, by covering said first side core with a second side core and by covering said second side core with a cladding and which satisfies Δ1>Δ3>Δ2 when the relative refractive index difference of said center core for said cladding is Δ1, the relative refractive index difference of said first side core for said cladding is Δ2, and the relative refractive index difference of said second side core for said cladding is Δ3.

The thirty-fourth configuration of the present invention is, in addition to the above twenty-fourth configuration, characterized in that the second optical fiber is an optical fiber which is formed by covering a center core with a first side core, by covering said first side core with a second side core and by covering said second side core with a cladding and which satisfies Δ1>Δ3>Δ2 when the relative refractive index difference of said center core for said cladding is Δ1, the relative refractive index difference of said first side core for said cladding is Δ2, and the relative refractive index difference of said second side core for said cladding is Δ3.

The thirty-fifth configuration of the present invention is, in addition to the above twenty-fifth configuration, characterized in that the second optical fiber is an optical fiber which is formed by covering a center core with a first side core, by covering said first side core with a second side core and by covering said second side core with a cladding and which satisfies Δ1>Δ3>Δ2 when the relative refractive index difference of said center core for said cladding is Δ1, the relative refractive index difference of said first side core for said cladding is Δ2, and the relative refractive index difference of said second side core for said cladding is Δ3.

Here, in the present invention, "set wavelength band" means a wavelength band having at least a 30 nm band and "wavelength in the vicinity of the center of the set wavelength band" means a wavelength in a range within 5 nm from the center wavelength of the set wavelength band.

In the above described configuration of the present invention, both of the first and the second optical fibers making up the optical transmission line have the absolute value of the dispersion value in the set wavelength band within the 1.5 μm wavelength band which is 6 ps/nm/km or more and the dispersion value in the set wavelength within the 1.5 μm wavelength band is shifted from zero. Therefore, the optical transmission line of the present invention can control the generation of the four light wave mixture which is supposed to dramatically influence the waveform distortion resulting from the non-linearity phenomenon and can control the waveform distortion resulting from the non-linearity phenomenon.

In both of the above described first and second optical fibers, the absolute value of the dispersion value in the set wavelength band within the 1.5 μm wavelength band is 14 ps/nm/km or less and the absolute value of the dispersion value in the set wavelength band within the 1.5 μm wavelength band is small compared to a single mode optical fiber or the like. Therefore, the optical transmission line of the present invention can control a local dispersion in the optical fiber making up the optical transmission line and can control the waveform distortion resulting from the local dispersion.

And when the dispersion value in the set wavelength band within the 1.5 μm wavelength band is too great, the waveform distortion resulting from the wavelength dispersion becomes large. In both of the above described first and second optical fibers applied to the optical transmission line of the present invention, however, the absolute value of the dispersion value in the set wavelength band within the 1.5 μm wavelength band is 14 ps/nm/km or less. That is to say, in the above described first and second optical fibers, the absolute value of the dispersion value in the set wavelength band within the 1.5 μm wavelength band is smaller compared to a single mode optical fiber or the like. Therefore, the optical transmission line of the present invention can control a local dispersion in the first and the second optical fibers and can control the waveform distortion resulting from the local dispersion.

And, since the dispersion value (total dispersion value) in the set wavelength band within the 1.5 μm wavelength band for the entire optical transmission line according to the present invention is made approximately zero, residual dispersion hardly exists in the entire optical transmission line and the distortion of the signal waveform resulting from the residual dispersion can be controlled.

In particular, the higher the intensity of the incoming light inputted to the optical fiber is, the more likely the above described non-linearity phenomenon will be generated. Therefore, in the optical transmission line according to the present invention, where the closer to the input end of the optical signal the arrangement location of the optical fiber is the lower the non-linearity of the optical fiber is, control of the waveform distortion resulting from the non-linearity phenomenon can be further assured. And when the mode field diameter in the set wavelength band within the 1.5 μm wavelength band is made to be large the influence by the self-phase modulation or by the cross-phase modulation, or the like, of the non-linearity phenomenon can be controlled and the waveform distortion resulting from the non-linearity phenomenon can be further controlled in a more sure fashion.

In addition, when the transmission loss in the set wavelength band within the 1.5 μm wavelength band is 0.30 dB/km or less (0.25 dB/km or less in the first optical fiber), the polarized wave mode dispersion value in the set wavelength band within the 1.5 μm wavelength band is 0.15 ps/km$^{1/2}$ or less, and the bending loss with the bending diameter of 20 mm in the set wavelength band within the 1.5 μm wavelength band is 10 dB/m or less, the waveform distortion resulting from the polarized wave mode dispersion can be controlled to gain an excellent optical transmission line with small transmission loss or bending loss.

In addition, the configuration where the first optical fiber is a single peak-type optical fiber, the configuration of a step type optical fiber and a configuration of a depressed center core type optical fiber can optimize the refractive index profile of the first optical fiber due to those refractive index profiles. Therefore, as for this configuration, the above described optical transmission line with excellent effects can be formed by utilizing the first optical fiber with the above described refractive index profile.

In addition, the configuration of the first optical fiber which satisfies Δ2>Δ3>Δ1 in the relationship among the relative refractive index difference Δ1 for the center core cladding, the relative refractive index difference Δ2 for the cladding of the first side core covering the center core and the relative refractive index difference Δ3 for the cladding of the second side core covering the first side core has the same effects as the configuration of the first optical fiber by the above described single peak-type optical fiber, or the like.

In addition, the configuration where the second optical fiber is a W type optical fiber optimizes the refractive index profile of the second optical fiber due to this refractive index profile and the optical transmission line with the above described excellent effects can be formed by using the second optical fiber of the above described refractive index profile.

In addition, the configuration of the second optical fiber which satisfies Δ1>Δ3>Δ2 in the relationship among relative refractive index difference Δ1 for the center core cladding, the relative refractive index difference Δ2 for the cladding of the first side core covering the center core and the relative refractive index difference Δ3 for the cladding of the second side core covering the first side core also has the same effects as the above.

BEST MODE FOR CARRYING OUT THE INVENTION

The present invention is described in detail based on the embodiment with reference to the attached drawings.

Figure 1:
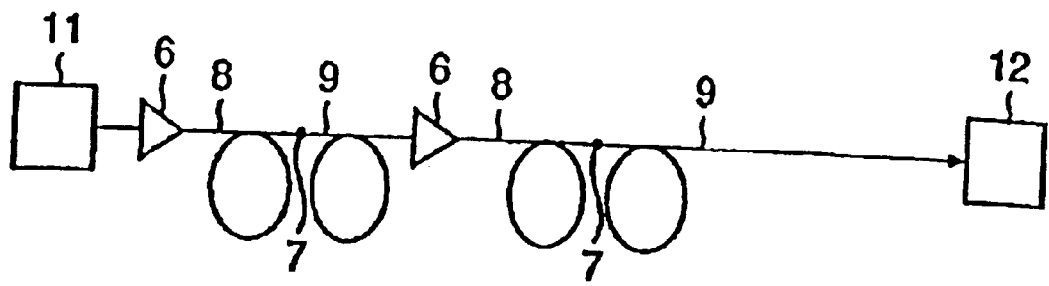
FIG. 1 is a configuration view showing an optical communication system to which one embodiment of an optical transmission line according to the present invention is applied.

In the following, the embodiments of the present invention are described based on the drawings. FIG. 1 shows a system configuration of the optical transmission system comprising one embodiment of the optical transmission line according to the present invention. As shown in the FIG. 1, the optical transmission line of the present embodiment is formed by connecting the first optical fiber 8 and the second optical fiber 9 in series. In the FIG. 1, a fused connection part between the first optical fiber 8 and the second optical fiber 9 is denoted as 7, an optical transmitter is denoted as 11 and an optical receiver is denoted as 12. And in the present embodiment, an optical amplifier 6 is provided to the incoming end of the first optical fiber 8.

The most characteristic point of the present invention is that an optical transmission line is formed by connecting the first and the second optical fibers 8 and 9 which have the following characteristics in series so that the dispersion value in the set wavelength band within the 1.5 μm wavelength band for the entire optical transmission line is made approximately zero (−1 ps/nm/km to +1 ps/nm/km). In the first optical fiber 8, the dispersion value in the set wavelength band within the 1.5 μm wavelength band is 6 to 14 ps/nm/km. In the second optical fiber 9, the dispersion value in the set wavelength band within the 1.5 μm wavelength band is −14 to −6 ps/nm/km.

And the dispersion slope of the first optical fiber 8 is positive, the dispersion slope of the second optical fiber 9 is negative and the dispersion slopes of the first optical fiber 8 and the second optical fiber 9 are, mutually, of opposite symbols. The dispersion slope in the set wavelength band within the 1.5 μm wavelength band for the entire optical transmission line is made approximately zero.

In the present embodiment the signal light wavelength transmitted from the optical transmitter 11 is the wavelength of the set wavelength band within the 1.5 μm wavelength band and light, with a plurality of mutually different wavelengths in this wavelength band, is transmitted along the optical transmission line while being amplified by the optical amplifier 6. And the optical amplifier 6 is an erbium dope light fiber type optical amplifier which effectively amplifies light of the set wavelength band within the 1.5 μm wavelength band.

In general, a positive dispersion optical fiber where the dispersion in the set wavelength band within the 1.5 μm wavelength band is a positive dispersion and a negative dispersion optical fiber where the dispersion in the same wavelength band is a negative dispersion are compared to find that the positive dispersion optical fiber comes to have less non-linearity than the negative dispersion optical fiber when light of the same wavelength band enters. And in the present embodiment the first optical fiber 8 is found to be the positive dispersion optical fiber from the dispersion characteristics in the set wavelength band within the 1.5 μm wavelength band and the second optical fiber 9 is the negative dispersion optical fiber. Therefore, as for the characteristics when light of the set wavelength band within the 1.5 μm wavelength band enters, the first optical fiber 8 comes to have less non-linearity than the second optical fiber 9.

Then, in the present embodiment, the first optical fiber 8 is connected to the emission end of the optical amplifier 6. That is to say, the optical transmission line of the present embodiment arranges the first optical fiber 8 and the second optical fiber 9 so that the closer to the side where the intense light signal is inputted the less non-linearity the optical fiber comes to have.

And in the optical transmission line of the present embodiment, the transmission loss in the wavelength of 1.55 μm is 0.25 dB/km or less and the polarized wave mode dispersion value in the wavelength of 1.55 μm is 0.15 ps/km$^{1/2}$ or less. And the optical transmission line of the present embodiment is made so that the bending loss with the bending diameter of 20 mm in the wavelength of 1.55 μm is 10 dB/m or less and the mode field diameter in the wavelength of 1.55 μm is 5.5 μm or more.

Next, the first optical fiber 8 comprising the optical transmission line of the present embodiment is described in detail. The first optical fiber 8 has any one of the refractive index profiles as shown in FIGS. 2(a) to 2(c). An optical fiber of the refractive index profile as shown in FIG. 2(a) is a depressed center core type optical fiber. This optical fiber is formed by covering the center core 1 with the side core 2, of which the refractive index is larger than that of the center core 1, and by covering the side core 2 with the cladding 5, of which the refractive index is smaller than that of the side core 2 and larger than that of the center core 1.

Optical fibers of the refractive index profiles as shown in FIGS. 2(b) and 2(c) have the following refractive index profiles. That is to say, those optical fibers are formed by covering the center core 1 with the first side core 3, by covering the first side core 3 with the second side core 4 and by covering the second side core 4 with the cladding 5. Then, those optical fibers satisfy Δ2>Δ3>Δ1 when the relative refractive index difference of the center core 1 for the cladding 5 is Δ1, the relative refractive index difference of the first side core 3 for the cladding 5 is Δ2 and the relative refractive index difference of the second side core 4 for the cladding 5 is Δ3.

The present inventors first assumed that the refractive index profile of the first optical fiber 8 is the refractive index profile as shown in FIG. 2(a). In order to optimize the refractive index profile of this first optical fiber 8, the relative refractive index difference Δ1 of the center core 1 for the cladding 5 and the relative refractive index difference Δ2 of the side core 2 for the cladding 5 are varied in core diameter in various ways. Then, the above described relative refractive index differences Δ1 and Δ2, the value (a/b) of the diameter a of the center core 1 divided by the diameter b of the side core 2 (Ra), and a value of core diameter (the diameter of the side core 2) are found so that the dispersion value in the wavelength 1.55 μm, the dispersion slope, the effective core section area ($A_{eff}$) and the bending loss have suitable values and the cutoff wavelength (λc) has also a suitable value. Here, the above described values are found through the use of a simulation, of which the results are shown in Table 1.

absolute value of the dispersion slope in the wavelength 1.55 μm is very small.

An optical fiber having the depressed center core type refractive index profile as shown in FIG. 2(a) does not include germanium in the center core 1. Therefore, this type of optical fiber has a small non-linearity refractive index, which makes it possible to control the waveform distortion resulting from the self-phase modulation or the cross-phase modulation, or the like. Here, the optical fiber of the refractive index profile as shown in FIGS. 2(b) and 2(c) does not include germanium in the center core 1 in the same way as the above described depressed center core type optical fiber, therefore those optical fibers also have small non-linearity refractive indexes and it is considered to be possible to control the waveform distortion resulting from the self-phase modulation, cross-phase modulation, or the like.

In addition, in the optical fibers of Examples 1 and 2, the dispersion value in the set wavelength band within the 1.5 μm wavelength band is in a range of 6 to 14 ps/nm/km. This value is large enough to be able to control the four light wave mixture within the range where the waveform distortion resulting from a local dispersion can be controlled. Therefore, the optical fibers of Examples 1 and 2 are able to control the waveform distortion resulting from a local dis-

TABLE 1

| unit | Δ1 % | Δ2 % | Ra | Core diam. μm | dispersion value ps/nm/km | slope ps/nm²/km | Aeff μm² | λC nm | bending loss dB/m |
|---|---|---|---|---|---|---|---|---|---|
| Example 1 | −0.5 | 0.75 | 0.50 | 6.20 | 6.64 | 0.067 | 81.5 | 1228 | 8.5 |
| Example 2 | −0.4 | 0.70 | 0.45 | 6.10 | 9.41 | 0.069 | 82.3 | 1346 | 6.0 |

Each of the relative refractive index differences Δ1 and Δ2 are defined by the following equations (3) and (4) when the refractive index of the vacuum is 1, the relative refractive index of the center core is n1, the relative refractive index of the side core 2 is n2 and the relative refractive index of the cladding 5 is nc, of which the unit is %.

$$\Delta 1 = [\{(n1)^2 - (nc)^2\}/2(n1)^2] \times 100 \quad (3)$$

$$\Delta 2 = [\{(n2)^2 - (nc)^2\}/2(n2)^2] \times 100 \quad (4)$$

As is clear from Table 1, the effective core section area is 80 μm² or more in either optical fiber in Examples 1 and 2.

persion and the waveform distortion resulting from the four light wave mixture.

Then two types of optical fibers of the refractive index profiles which are close to Examples 1 and 2 in Table 1 are, actually, trial manufactured to serve as Trial Examples 1 and 2. And, at the same time, in the optical fibers of the refractive index profiles as shown in FIGS. 2(b) and 2(c), four types of optical fibers of which the Δ1 and Δ2 are close to those of Examples 1 and 2 in Table 1 so as to serve as Trial Examples 3 to 6. Then, the characteristics of the optical fibers of those Trial Examples 1 to 6 are found. The characteristics of Trial Examples 1 to 6 are shown in Table 2.

TABLE 2

| unit | transmission loss dB/km | dispersion value of 1550 nm ps/nm/km | dispersion slope of 1550 nm ps/nm²/km | MFD μm | Aeff μm² | bending loss 20φ dB/m | λC nm |
|---|---|---|---|---|---|---|---|
| prototype 1 | 0.230 | 7.1 | 0.025 | 9.83 | 81.3 | 8.9 | 947 |
| prototype 2 | 0.225 | 12.1 | 0.035 | 9.84 | 83.2 | 9.7 | 894 |
| prototype 3 | 0.250 | 6.1 | 0.028 | 9.71 | 79.6 | 6.2 | 1295 |
| prototype 4 | 0.245 | 9.8 | 0.032 | 9.77 | 80.2 | 9.9 | 1236 |
| prototype 5 | 0.235 | 7.4 | 0.029 | 9.85 | 82.0 | 7.5 | 1065 |
| prototype 6 | 0.240 | 10.2 | 0.035 | 9.79 | 80.6 | 5.3 | 1429 |

That is to say, it can be confirmed that in the optical fibers of Examples 1 and 2, the effective core section area which is the same or more of the effective core section area of a conventional single mode optical fiber is gained. Here, the slope in Table 1 is a dispersion slope in the wavelength of 1.55 μm, and in the optical fiber of Examples 1 and 2 the Here, in Trial Examples 3 to 6 (in the optical fibers of the refractive index profiles as shown in FIGS. 2(b) and 2(c)), the relative refractive index difference Δ1 is defined by the above described equation (3). In Trial Examples 3 to 6, Δ2 and Δ3 are, respectively, defined by the above described equation (4) and the following equation (5) when the refractive index of the vacuum is 1, the refractive index of the first side core 3 is n2 and the refractive index of the second side core 4 is n3. The unit of those relative refractive index differences Δ1 to Δ3 is %.

$$\Delta 3=[\{(n3)^2-(nc)^2\}/2(n3)^2]\times 100 \quad (5)$$

Figure 2:
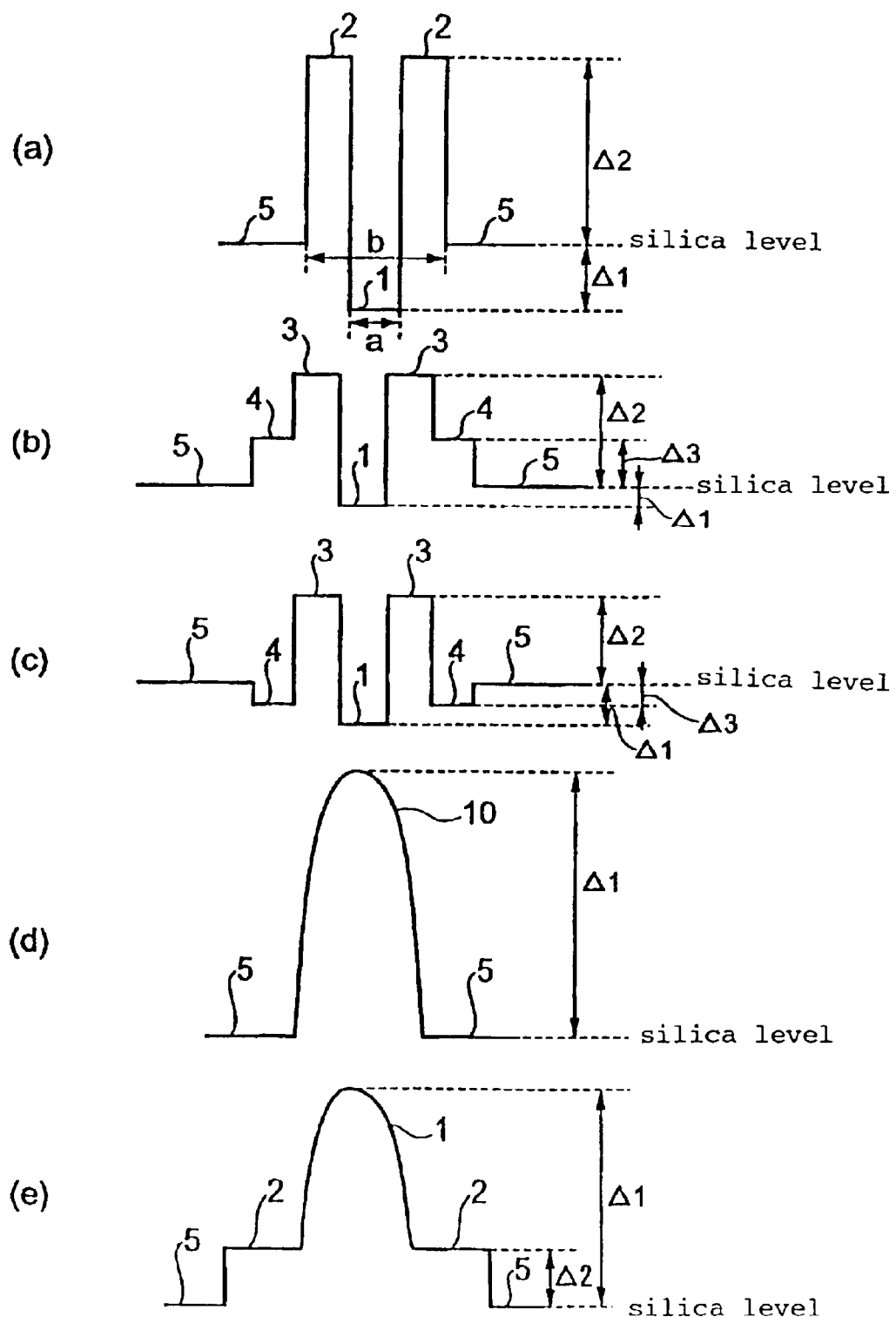
FIG. 2 is a descriptive diagram showing an example of the refractive index profile of the first optical fiber which is applied to the above described embodiment and an optical transmission line of another embodiment according to the present invention.

The refractive index profiles of Trial Examples 3 and 4 in Table 2 have the refractive index profile as shown in FIG. 2(*b*). The second side core 4 is formed by germanium doped crystal and the refractive index of the second side core 4 is larger than the refractive index of cladding 5. And the refractive index profiles of Trial Examples 5 and 6 in Table 2 have the refractive index profiles as shown in FIG. 2(*c*). The second side core 4 is formed by fluoride doped crystal and the refractive index of the second side core 4 is smaller than the refractive index of the cladding 5.

As is clear from Table 2, all optical fibers of Trial Examples 1 to 6 are found to have excellent characteristics, being almost the same as the simulation result as shown in Table 1. That is to say, optical fibers of those Trial Examples 1 to 6 have the effective core section area of approximately 80 $\mu m^2$ and the control of the waveform distortion is possible by the self-phase modulation, the cross-phase modulation, or the like. And in the optical fibers of Trial Examples 1 to 6 the dispersion value in the set wavelength band within the 1.5 $\mu m$ wavelength band is a range of 6 to 14 ps/nm/km. This value is in a range wherein the waveform distortion resulting from a local dispersion can be controlled and is large enough to control the four light wave mixture and it is confirmed that the optical fibers of Trial Examples 1 to 6 can control the waveform distortion resulting from a local dispersion as well as the waveform distortion resulting from the four light wave mixture.

As is clear from Tables 1 and 2, it is confirmed that the optical fibers of Examples 1 and 2, as well as Trial Examples 1 to 6, can control the transmission loss in the wavelength 1.55 $\mu m$. In addition, in any of those optical fibers the value of polarized wave mode dispersion is approximately 0.1 ps/km$^{1/2}$, which is a small value.

Figure 3:
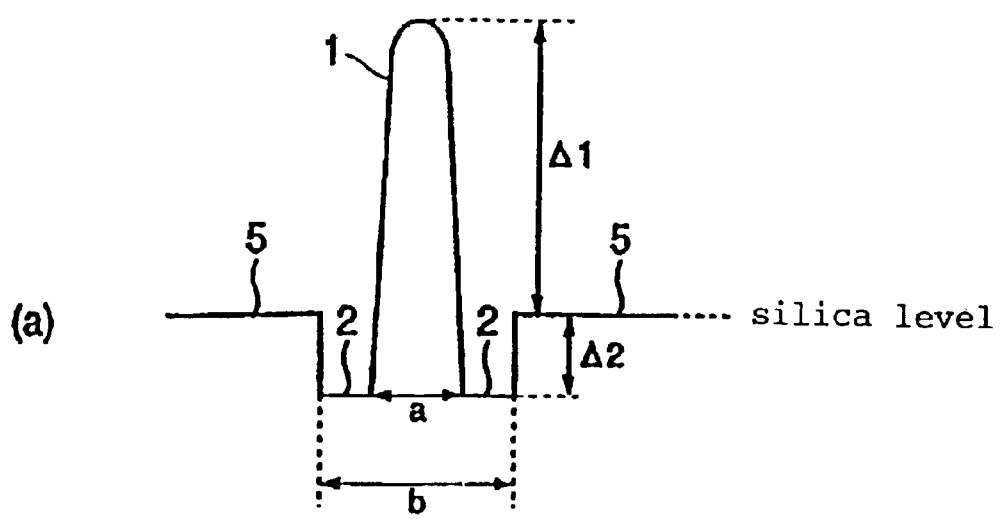
FIG. 3 is a descriptive diagram showing an example of the refractive index profile of the second optical fiber which is applied to the optical transmission line of the above described embodiment.
Figure 3:
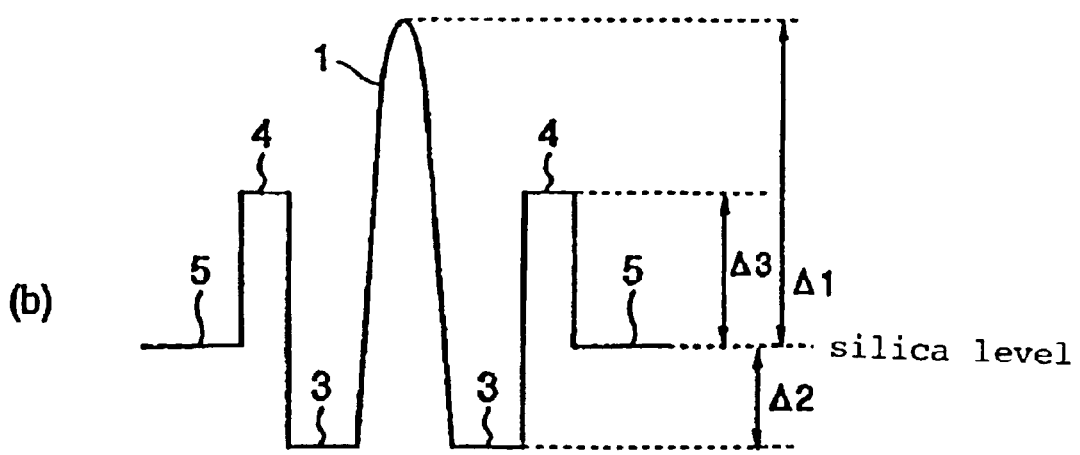

Next, the second optical fiber 9 forming an optical transmission line according to the present embodiment is described in detail. The second optical fiber 9 has a refractive index profile as shown in either one of FIGS. 3(*a*) and 3(*b*). The optical fiber with the refractive index profile as shown in FIG. 3(*a*) is a W-type optical fiber. This optical fiber is formed by covering the center core 1 with the side core 2 of which the refractive index is smaller than that of the center core 1 and by covering the side core 2 with the cladding 5, of which the refractive index is larger than that of the side core 2 and smaller than that of the center core 1.

The optical fiber with the refractive index profile as shown in FIG. 3(*b*) is formed by covering the center core 1 with the first side core 3, by covering the first side core 3 with the second side core 4 and by covering the second side core 4 with the cladding 5. Then, this optical fiber satisfies Δ1>Δ3>Δ2 when the relative refractive index difference of the center core 1 to the cladding 5 is Δ1, the relative refractive index difference of the first side core 3 to the cladding 5 is Δ2 and the relative refractive index difference of the second side core 4 to the cladding 5 is Δ3.

The present inventors first presumed that the refractive index profile of the second optical fiber 9 is the refractive index profile as shown in FIG. 3(*a*). In order to optimize this refractive index profile of the second optical fiber 9, the relative refractive index difference Δ1 of the center core 1 to the cladding 5, the relative refractive index difference Δ2 of the side core 2 to the cladding 5 and the diameter of the core are varied in many ways. Then, in the same way as when the refractive index profile of the first optical fiber 8 was determined, the values of the relative refractive index differences Δ1, Δ2, Ra and the core diameter are found so that the dispersion value in the wavelength of 1.55 $\mu m$, the dispersion slope, the effective core section area ($A_{eff}$) and bending loss have suitable values and the cut off wavelength has also a suitable value. These values are found by use of a simulation, of which the result is shown in Table 3.

TABLE 3

| unit | Δ1 % | Δ2 % | Ra | Core diam. $\mu m$ | dispersion value ps/nm/km | slope ps/nm$^2$/km | Aeff $\mu m^2$ | λC nm | bending loss dB/m |
|---|---|---|---|---|---|---|---|---|---|
| Example 3 | 0.85 | −0.3 | 0.45 | 12.20 | −8.54 | −0.047 | 32.1 | 848 | 6.5 |
| Example 4 | 1.15 | −0.4 | 0.40 | 9.10 | −11.44 | −0.066 | 23.3 | 876 | 4.0 |

Here, each of the relative refractive index differences Δ1 and Δ2 is found in the same way as each of the relative refractive index differences Δ1 and Δ2 in Table 1.

As is clear from Table 3, either optical fiber of Examples 3 and 4 has the dispersion value in the set wavelength band within the 1.5 $\mu m$ wavelength band which is within the range of −14 to −6 ps/nm/km. That is to say, it is confirmed that in the optical fibers of Examples 3 and 4, the absolute value of the dispersion value in the above described set wavelength band is large enough to be able to control the four light wave mixture within the range where a local dispersion can be controlled and control the waveform distortion due to the four light wave mixture.

As described in the above, the first optical fiber 8 has the dispersion value in the set wavelength band within the 1.5 $\mu m$ wavelength band which is within the range of 6 to 14 ps/nm/km. Therefore, by connecting this second optical fiber 9 to this first optical fiber 8, the dispersions in the set wavelength band within the 1.5 $\mu m$ wavelength band of the first optical fiber 8 and the second optical fiber are offset. Accordingly, the optical transmission line according to the present embodiment which is formed by connecting the first optical fiber 8 and the second optical fiber 9 in series is considered to be able to implement a low dispersion over a broad wavelength range.

Then, two types of optical fibers with a refractive index profile which is close to that of Examples 3 and 4 in Table 3 are, actually, trial manufactured as Trial Examples 7 and 8. And, as for the optical fiber with the refractive index profile as shown in FIG. 3(*b*), two types of optical fibers of which the Δ1 and Δ2 are close to those of Examples 3 and 4 in Table 3 are trial manufactured as Trial Examples 9 and 10. Then, the characteristics of the optical fibers of those Trial Examples 7 to 10 are found. The characteristics of Trial Examples 7 to 10 are shown in Table 4.

TABLE 4

| unit | transmission loss dB/km | dispersion value of 1550 nm ps/nm/km | dispersion slope of 1550 nm ps/nm²/km | MFD μm | Aeff μm² | bending loss 20φ dB/m | λC nm |
|---|---|---|---|---|---|---|---|
| prototype 7 | 0.230 | −7.1 | −0.015 | 5.83 | 25.4 | 8.9 | 904 |
| prototype 8 | 0.225 | −12.1 | −0.020 | 5.84 | 25.6 | 9.8 | 894 |
| prototype 9 | 0.250 | −8.1 | −0.038 | 6.01 | 27.2 | 4.2 | 1429 |
| prototype 10 | 0.245 | −10.8 | −0.042 | 6.07 | 27.8 | 3.9 | 1436 |

Here, in the optical fibers of Trial Examples 9 and 10 (in the optical fibers with the refractive index profile as shown in FIG. 3(b)), the relative refractive index difference Δ1 is defined by the above described equation (3). And Δ2 and Δ3 in the optical fibers of Trial Examples 9 and 10 are defined by the above described equations (4) and (5) when the refractive index of the first side core 3 is n2 and the refractive index of the second side core 4 is n3 while the refractive index of the vacuum is 1. The unit of those relative refractive index differences Δ1 to Δ3 is %.

In the optical fibers of Trial Examples 9 and 10 in Table 4, the second side core 4 is formed of germanium doped crystal.

As is clear from Table 4, all the optical fibers of Trial Examples 7 to 10 have excellent characteristics in the same way as the simulation result shown in Table 3. That is to say, the optical fibers of Trial Examples 7 to 10 have the dispersion value in the set wavelength band within the 1.5 μm wavelength band which is within the range of −14 to −6 ps/nm/km. This value is within the range where the absolute value of the dispersion value of the above described set wavelength can control the waveform distortion due to a local dispersion and is a value large enough to be able to control the four light wave mixture. Therefore, it is confirmed that the optical fibers of Trial Examples 7 to 10 are able to control both the waveform distortion due to a local dispersion and the waveform distortion due to the four light wave mixture. And by connecting the second optical fiber 9 of Trial Examples 7 to 10 to the above described first optical fiber 8, the dispersions in the set wavelength band within the 1.5 μm wavelength band of the first optical fiber 8 and the second optical fiber 9 are offset. Therefore, an optical transmission line formed by connecting the first optical fiber 8 and the second optical fiber 9 in series can implement a low dispersion over a broad wavelength range.

As is clear from Tables 3 and 4, it is confirmed that the optical fibers of Examples 3 and 4, as well as in Trial Examples 7 to 10, are also able to control the transmission loss in the wavelength 1.55 μm. In addition, it is confirmed that all those optical fibers have a polarized wave mode dispersion value of approximately 0.1 ps/km$^{1/2}$, which is a low value.

The present inventors trial manufactured the first and the second optical fibers 8 and 9, respectively, as described above and, afterwards, trial manufactured an optical transmission line by connecting the first optical fiber 8 and the second optical fiber 9 in series by fusion connection. Then, the fusion connection loss of this optical transmission line was measured and it was found that the average connection loss was approximately 0.6 dB. And a dispersion shift optical fiber, of which the mode field diameter in the wavelength of 1.55 μm is approximately 8 μm, is provided between the first optical fiber 8 and the second optical fiber 9 and the connection loss at this time was measured and found to be approximately 0.5 dB.

Figure 4:
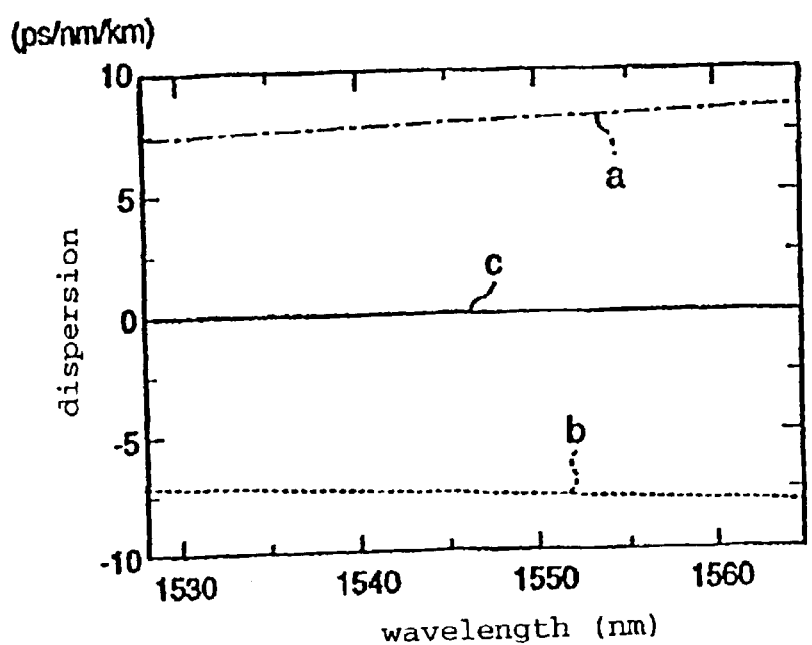
FIG. 4 is a graph showing, respectively, examples of dispersion characteristics of the first optical fiber, the second optical fiber and the optical transmission line formed by connecting those optical fibers.

The characteristic curve a in FIG. 4 shows a dispersion characteristic example in the set wavelength band within the 1.5 μm wavelength band of the first optical fiber 8 and the characteristic curve b in FIG. 4 shows a dispersion characteristic example in the set wavelength band within the 1.5 μm wavelength band of the second optical fiber 9, respectively. In addition, the characteristic curve c in FIG. 4 shows a dispersion characteristic example when the first optical fiber 8 and the second optical fiber are connected by providing 2 km of the above described dispersion shift optical fiber between 20 km of the first optical fiber 8 and 20 km of the second optical fiber 9.

As shown in FIG. 4, the dispersions in the set wavelength band within the 1.5 μm wavelength band of the first optical fiber 8 and the second optical fiber 9 are offset. Accordingly, an optical transmission line formed by connecting the first optical fiber 8 and the second optical fiber 9 in series has been confirmed to implement a low dispersion over broad wavelength range.

According to the present embodiment, the refractive index profiles of the first optical fiber 8 and the second optical fiber 9 are, respectively, determined based on the above examined result. Then, based on those refractive index profiles, the dispersion value in the set wavelength band within the 1.5 μm wavelength band of the first optical fiber is set between 6 to 14 ps/nm/km while the dispersion value in the set wavelength band within the 1.5 μm wavelength band of the second optical fiber 9 is set between −14 to −6 ps/nm/km.

Then, according to the present embodiment, an optical transmission line is formed by connecting those optical fibers in series. Accordingly, in the present embodiment, the dispersion value (total dispersion value) in the set wavelength band within the 1.5 μm wavelength band is made approximately zero while in the entire optical transmission line the residual dispersion is make approximately zero so as to be able to control the distortion of the signal waveform due to the residual dispersion.

Moreover, the above described first and second optical fibers 8 and 9 both have the absolute value of the dispersion value in the set wavelength band within the 1.5 μm wavelength band of 6 ps/nm/km or more. That is to say, in the first and second optical fibers 8 and 9, the dispersion value in the wavelength 1.55 μm is shifted from zero and, therefore, the occurrence of the four light wave mixture which is supposed to dramatically influence the waveform distortion due to the non-linearity phenomenon becomes controllable and the waveform distortion due to non-linearity phenomenon can be controlled.

In the case that the dispersion value in the set wavelength band within the 1.5 μm wavelength band is too large, the waveform distortion due to the wavelength dispersion becomes large. On the contrary, in the present embodiment, said first and second optical fibers both have the absolute value of the dispersion value in the set wavelength band within the 1.5 μm wavelength band of 14 ps/nm/km or less and the absolute value of the dispersion value in the set wavelength band within the 1.5 μm wavelength band is smaller compared to that of a single mode optical fiber, or the like. Therefore, in the optical transmission line of the present embodiment, a local dispersion in each optical fiber forming the optical transmission line can be controlled and the waveform distortion due to the dispersion becomes controllable.

In addition, the larger the intensity of incoming light inputted to the optical fiber is, the more easily the above described non-linearity phenomenon occurs. Therefore, in the present embodiment, the first optical fiber 8 and the second optical fiber 9 are arranged so that the closer to the end to which the strong optical signal is inputted, the lower the non-linearity of the optical fiber is (the first optical fiber 8 is connected to the emission end of the optical amplifier 6 and the second optical fiber 9 is connected to the emission end of the first optical fiber 8). Therefore, in an optical transmission line according to the present embodiment, the control of waveform distortion due to the non-linearity phenomenon can be carried out without failure.

In addition, in the present embodiment, the mode field diameter in the wavelength 1.55 μm of the first optical fiber 8 is made 9.5 μm or more so that the effective core section area becomes as large as approximately 80 μm$^2$. And the mode field diameter in the wavelength 1.55 μm of the second optical fiber 9 is made 5.5 μm or more, which becomes larger than that of a conventional negative dispersion optical fiber. Therefore, in an optical transmission line according to the present embodiment, the influence caused by the self-phase modulation, the cross-phase modulation, or the like, within the non-linearity phenomenon can be controlled so as to carry out the control of the waveform distortion due to the non-linearity phenomenon without failure.

In addition, according to the present embodiment, the transmission loss in the 1.55 μm wavelength of the first optical fiber 8 is 0.25 dB/km or less, the polarized wave mode dispersion value in the wavelength 1.55 μm is 0.15 ps/km$^{1/2}$ or less, the bending loss with the bending diameter of 20 mm in the wavelength 1.55 μm is 10 dB/m or less. And, the transmission loss in the wavelength 1.55 μm of the second optical fiber 9 is 0.30 dB/km or less, the polarized wave mode dispersion value in the wavelength 1.55 μm is 0.15 ps/km$^{1/2}$ or less and the bending loss with the bending diameter 20 mm in the wavelength 1.55 μm is 10 dB/m or less. Therefore, in an optical transmission line of the present embodiment, the transmission loss in the set wavelength band within the 1.5 μm wavelength band is small, the waveform distortion due to a polarized wave mode dispersion can be controlled and the loss due to bending can be made smaller so that the signal light transmission can be performed under excellent conditions.

The present invention is not limited to the above described embodiments but, rather, may adopt a variety of embodiments. For example, the first optical fiber 8 may be formed by covering the core 10 with the cladding 5, as shown in FIG. 2(d), to become a single peak-type optical fiber of which the refractive index distribution forms a profile of the αth power. And the first optical fiber 8 may be a step type optical fiber which is formed by covering the center core 1 with the side core 2 of which the refractive index is smaller than that of the center core 1 and by covering the side core 2 with the cladding 5 of which the refractive index is smaller than that of the side core 2 as shown in FIG. 2(e). In this step type optical fiber, the center core 1 has a refractive index distribution forming a profile of the αth power.

Table 5 shows the characteristics of Examples 5 and 6 of the above described single peak-type optical fiber and Table 6 shows the characteristics of Examples 7 and 8 of the above described step type optical fiber. Here, in Tables 5 and 6, the value of α, which shows the refractive distribution form of the core 10 and the center core 1, is also shown.

TABLE 5

| Unit | Δ1 % | α | Core diam. μm | dispersion value of 1550 nm ps/nm/km | dispersion slope of 1550 nm ps/nm$^2$/km | Aeff μm$^2$ | λC nm | bending loss 20φ dB/m |
|---|---|---|---|---|---|---|---|---|
| Example 5 | 0.40 | 3.0 | 10.5 | 13.1 | 0.062 | 77.4 | 1859 | 7.0 |
| Example 6 | 0.45 | 2.0 | 9.4 | 13.4 | 0.061 | 72.5 | 1166 | 9.5 |

TABLE 6

| Unit | Δ1 % | α | Δ2 | Ra | Core diam. μm | dispersion value of 1550 nm ps/nm/km | dispersion slope of 1550 nm ps/nm$^2$/km | Aeff μm$^2$ | λC nm | bending loss 20φ dB/m |
|---|---|---|---|---|---|---|---|---|---|---|
| Example 7 | 0.40 | 4.0 | 0.15 | 0.55 | 14.0 | 13.6 | 0.067 | 94.7 | 1519 | 6.0 |
| Example 8 | 0.45 | 2.0 | 0.20 | 0.45 | 11.4 | 13.0 | 0.064 | 79.5 | 1466 | 8.5 |

In Table 5, the relative refractive index difference Δ1 is defined as in the above described equation (3) when the relative refractive index of the core 10 is n1 and the relative refractive index of the cladding 5 is nc while the refractive index of the vacuum is 1, of which the unit is %. And, in Table 5, each of the relative refractive index differences Δ1 and Δ2 is defined as in the above described equations (3) and (4) when the relative refractive index of the center core is n1, the relative refractive index of the side core 2 is n2 and the relative refractive index of the cladding 5 is nc while the refractive index of the vacuum is 1, of which the unit is %.

As shown in Tables 5 and 6, in the case that the first optical fiber 8 is formed by the refractive index profile of the above described single peak-type or the step type, the same effects as in the above described embodiments can be gained by properly setting the detailed values of the refractive index profile (the relative refractive index differences Δ1 and Δ2, α, or the like).

Each of the values of the relative refractive index differences Δ1, Δ2 and Δ3 in the refractive index profiles of the first and second optical fibers 8 and 9 is not limited to that of each of the above described examples and trial examples. That is to say, each value of the relative refractive index differences Δ1, Δ2 and Δ3 may be properly set so as to have the dispersion characteristic such as for the first optical fiber 8 and the second optical fiber 9 in the above described embodiments. Each value of the relative refractive index differences Δ1, Δ2 and Δ3 is, preferably, set taking the transmission loss in the set wavelength band within the 1.5 μm wavelength band, a polarized wave mode dispersion, and a bending loss, or the like, into account.

In addition, the number and the arrangement order of the first optical fibers 8 and the second optical fibers 9 forming the optical transmission line of the present invention are not specifically limited but they should be properly adjusted. For example, in the case that the optical transmission line is formed by connecting the first optical fibers 8 and the second optical fibers 9 without providing optical amplifiers, it is possible to lower the possibility of the occurrence of the non-linearity phenomenon by arranging the optical fibers so that the closer to the input end of the optical signal optical fibers are, the lower the non-linearity of the optical fibers is.

Figure 5:
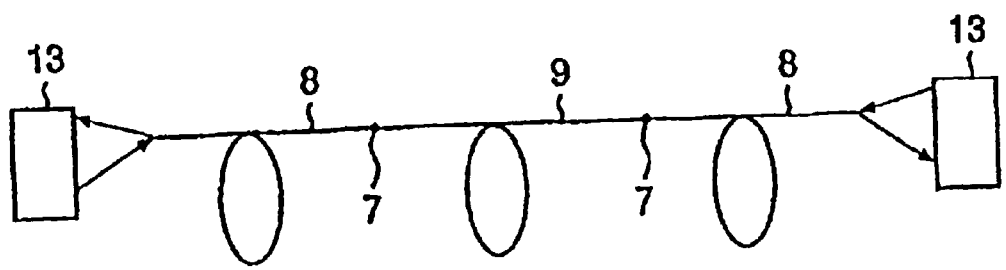
FIG. 5 is a configuration view showing an optical communication system to which another embodiment of the optical transmission line according to the present invention is applied.

And, as shown in FIG. 5, the second optical fiber 9 is connected between the two first optical fibers 8 so that an optical transmission line can be formed wherein bi-directional communication for transmitting and receiving light becomes possible by using the optical transceiver 13.

Industrial Applicability

As described above, in an optical transmission line according to the present invention, a local dispersion in the first and the second optical fibers can be controlled, the waveform distortion due to a local dispersion can be controlled and the dispersion value (total dispersion value) in the set wavelength band within the 1.5 μm wavelength band for the entire optical transmission line is made approximately zero. Therefore, the optical transmission line of the present invention has little residual dispersion over the entire optical transmission line and can control the distortion of the signal waveform due to the residual dispersion, and is suitable as an optical transmission line for wavelength division multiplexed transmission of the 1.5 μm wavelength band or the like.

What is claimed is:

1. An optical transmission line comprising:
   a first optical fiber having a first dispersion value of 6 to 14 ps/nm/km in a set wavelength band within the 1.5 μm wavelength band;
   a second optical fiber having a second dispersion value of −14 to −6 ps/nm/km in the set wavelength band within the 1.5 μm wavelength band;
   an overall dispersion value is substantially zero for the entire optical transmission line in the set wavelength band within the 1.5 μm wavelength band;
   said first optical fiber is connected in series to said second optical fiber:
     said optical transmission line is arranged such that an optical signal inputs said optical transmission line through said first optical fiber and said first optical fiber has a non-linearity less than a non-linearity of said second optical fiber; and
     a dispersion slope of said first optical fiber has an opposite sign to a dispersion slope of said second optical fiber, and an overall dispersion slope is substantially zero for the entire transmission line in the set wavelength band within the 1.5 μm wavelength band,
     wherein said second optical fiber has at a wavelength in a vicinity of a center of the set wavelength band within the 1.5 μm wavelength band:
       a transmission loss of 0.30 dB/km or less,
       a mode dispersion value of 0.15 ps/km or less,
       a bending loss of 10 dB/m or less in the bending diameter of 20 mm, and
       a mode field diameter of 5.5 μm or more.

2. The optical transmission line according to claim 1, wherein said first optical fiber has at a wavelength in a vicinity of a center of the set wavelength band within the 1.5 μm wavelength band:
   a transmission loss of 0.25 dB/km or less,
   a polarization mode dispersion value of 0.15 ps/km or less,
   a bending loss of 10 dB/m or less in a bending diameter of 20 mm, and
   a mode field diameter of 9.5 μm or more.

3. The optical transmission line according to claim 2, wherein said first optical fiber is a single-peak type optical fiber comprising:
   a core, and
   a cladding surrounding said core,
   wherein said core has an α-profile.

4. The optical transmission line according to claim 2, wherein said first optical fiber is a dual core optical fiber comprising:
   a center core,
   a side core surrounding said center core and having a refractive index smaller than a refractive index of said center core, and
   a cladding surrounding said side core and having a refractive index smaller than said refractive index of said side core.

5. The optical transmission line according to claim 2, wherein said first optical fiber is a depressed center core optical fiber comprising:
   a center core,
   a side core surrounding said center core and having a refractive index larger than a refractive index of said center core, and
   a cladding surrounding said side core and having a refractive index smaller than said refractive index of said side core and larger than said refractive index of said center core.

6. The optical transmission line according to claim 2, wherein said first optical fiber comprises:
   a center core,
   a first side core surrounding said center core,
   a second side core surrounding said first side core, and
   a cladding surrounding said second side core such that a relation Δ2>Δ3>Δ1 is satisfied, where a relative refractive index difference of said center core and said cladding is Δ1, a relative refractive index difference of said first side core and said cladding is Δ2, and a relative refractive index difference of said second side core and said cladding is Δ3.

7. The optical transmission line according to claim 1, wherein said first optical fiber is a single-peak type optical fiber comprising:
   a core, and
   a cladding surrounding said core,
   wherein said core has an α-profile.

8. The optical transmission line according to claim 1, wherein said first optical fiber is a dual core optical fiber comprising:

a center core, a side core surrounding said center core and having a refractive index smaller than a refractive index of said center core, and a cladding surrounding said side core and having a refractive index smaller than said refractive index of said side core.

9. The optical transmission line according to claim 1, wherein said first optical fiber is a depressed center core optical fiber comprising:

a center core, a side core surrounding said center core and having a refractive index larger than a refractive index of said center core, and a cladding surrounding said side core and having a refractive index smaller than said refractive index of said side core and larger than said refractive index of said center core.

10. The optical transmission line according to claim 1, wherein said first optical fiber comprises:

a center core, a first side core surrounding said center core, a second side core surrounding said first side core, and a cladding surrounding said second side core such that a relation $\Delta 2 > \Delta 3 > \Delta 1$ is satisfied, where a relative refractive index difference of said center core and said cladding is $\Delta 1$, a relative refractive index difference of said first side core and said cladding is $\Delta 2$, and a relative refractive index difference of said second side core and said cladding is $\Delta 3$.

11. The optical transmission line according to claim 1, wherein said second optical fiber is a W-shape optical fiber comprising:

a center core, a side core surrounding said center core and having a refractive index smaller than a refractive index of said center core, a cladding surrounding said side core and having a refractive index larger than said refractive index of said side core and smaller than said refractive index of said center core.

12. The optical transmission line according to claim 1, wherein said second optical fiber comprises:

a center core, a first side core surrounding said center core, a second side core surrounding said first side core, and a cladding surrounding said second side core such that a relationship $\Delta 1 > \Delta 3 > \Delta 2$ is satisfied, where a relative refractive index difference of said center core and said cladding is $\Delta 1$, a relative refractive index difference of said first side core and said cladding is $\Delta 2$, and a relative refractive index difference of said second side core and said cladding is $\Delta 3$.

13. The optical transmission line according to claim 1, wherein said second optical fiber is a W-shape optical fiber comprising:

a center core, a side core surrounding said center core and having a refractive index smaller than a refractive index of said center core, a cladding surrounding said side core and having a refractive index larger than said refractive index of said side core and smaller than said refractive index of said center core.

14. The optical transmission line according to claim 1, wherein said second optical fiber comprises:

a center core, a first side core surrounding said center core, a second side core surrounding said first side core, and a cladding surrounding said second side core such that a relationship $\Delta 1 > \Delta 3 > \Delta 2$ is satisfied, where a relative refractive index difference of said center core and said cladding is $\Delta 1$, a relative refractive index difference of said first side core and said cladding is $\Delta 2$, and a relative refractive index difference of said second side core and said cladding is $\Delta 3$.

15. An optical transmission line comprising:

a first optical fiber;

a second optical fiber positioned such that said first optical fiber is closer to an input of an optical signal than said second optical fiber;

said optical transmission line has an average dispersion for the entire optical transmission line substantially zero in a set wavelength band within the 1.5 $\mu$m wavelength band; and said first optical fiber has at a wavelength in a vicinity of a center of the set wavelength band within the 1.5 $\mu$m wavelength band:

a dispersion value of 6 to 14 ps/nm/km and a sign opposite to a dispersion value of said second optical fiber, a transmission loss of 0.25 dB/km or less, a polarization mode dispersion value of 0.15 ps/km or less, a bending loss of 10 dB/m or less in the bending diameter of 20 mm, and a mode field diameter of 9.5 $\mu$m or more, wherein said second optical fiber has at said wavelength in said vicinity of said center of the set wavelength band within the 1.5 $\mu$m wavelength band:

a dispersion value of −14 to −6 ps/nm/km, a transmission loss of 0.30 dB/km or less, a polarization mode dispersion value of 0.15 ps/km or less, a bending loss of 10 dB/m or less in the bending diameter of 20 mm, and a mode field diameter of 5.5 $\mu$m or more.

* * * * *